United States Patent
Li et al.

(10) Patent No.: US 9,084,231 B2
(45) Date of Patent: Jul. 14, 2015

(54) METHODS AND APPARATUS FOR ACQUIRING AND USING MULTIPLE CONNECTION IDENTIFIERS

(75) Inventors: Junyi Li, Bedminster, NJ (US); Rajiv Laroia, Far Hills, NJ (US); Saurabh Tavildar, Jersey City, NJ (US); Xinzhou Wu, Monmouth Junction, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 952 days.

(21) Appl. No.: 12/047,741

(22) Filed: Mar. 13, 2008

(65) Prior Publication Data

US 2009/0232086 A1     Sep. 17, 2009

(51) Int. Cl.
| | |
|---|---|
| H04W 4/00 | (2009.01) |
| H04L 12/28 | (2006.01) |
| H04W 76/02 | (2009.01) |
| H04W 8/00 | (2009.01) |
| H04W 84/18 | (2009.01) |

(52) U.S. Cl.
CPC ............ *H04W 76/021* (2013.01); *H04W 8/005* (2013.01); *H04W 76/023* (2013.01); *H04W 76/025* (2013.01); *H04W 84/18* (2013.01)

(58) Field of Classification Search
USPC .......................... 370/431–436, 441–444, 330
See application file for complete search history.

(56) References Cited

U.S. PATENT DOCUMENTS

| | | | |
|---|---|---|---|
| 7,133,354 B2 | 11/2006 | Laroia et al. | |
| 7,263,377 B1 | 8/2007 | Wahlstrom et al. | |
| 7,272,400 B1 | 9/2007 | Othmer | |
| 7,369,856 B2 | 5/2008 | Ovadia | |
| 7,577,150 B2 | 8/2009 | Poustchi et al. | |
| 7,590,696 B1 * | 9/2009 | Odell et al. | 709/206 |

(Continued)

FOREIGN PATENT DOCUMENTS

| | | |
|---|---|---|
| CN | 1333979 A | 1/2002 |
| CN | 1441604 A | 9/2003 |

(Continued)

OTHER PUBLICATIONS

International Search Report and Written Opinion—PCT/US09/035188, International Searching Authority—European Patent Office, Jun. 22, 2009.

(Continued)

*Primary Examiner* — Gerald Smarth
(74) *Attorney, Agent, or Firm* — James K. O'Hare

(57) ABSTRACT

Methods and apparatus related to a peer to peer wireless communications system supporting the association of multiple connection identifiers with a single connection between a pair of wireless terminals are described. A differentiated quality of service is supported by assigning different numbers of connection identifiers to different connections. The number of connection identifiers assigned to a wireless terminal pair for a connection is a function of one of: data rate, priority information, and quality of service information. Being allocated a higher number of connection identifiers results in being allocated a higher number of traffic transmission request resources, thus increasing the likelihood that the connection is permitted to use a traffic transmission segment. The allocation of connection identifiers is performed in a distributed manner in which handshake signaling occurs between a wireless terminal pair seeking to establish a connection, e.g., as part of a multi-step paging scheme.

43 Claims, 9 Drawing Sheets

(56) References Cited

U.S. PATENT DOCUMENTS

| | | |
|---|---|---|
| 7,599,321 B2 | 10/2009 | Lee et al. |
| 7,633,863 B2 | 12/2009 | Kim et al. |
| 7,986,698 B2 | 7/2011 | Li et al. |
| 8,005,091 B2 | 8/2011 | Wu et al. |
| 8,223,655 B2 * | 7/2012 | Heinz et al. .................. 370/241 |
| 8,284,773 B1 * | 10/2012 | Woleben et al. ............. 370/390 |
| 8,355,407 B2 * | 1/2013 | Wookey et al. ............... 370/401 |
| 2001/0038620 A1 | 11/2001 | Stanwood et al. |
| 2002/0131388 A1 | 9/2002 | Ami et al. |
| 2003/0103520 A1 * | 6/2003 | Chen et al. ................... 370/444 |
| 2004/0125776 A1 * | 7/2004 | Haugli et al. ................. 370/338 |
| 2004/0162871 A1 * | 8/2004 | Pabla et al. ................... 709/201 |
| 2004/0243682 A1 * | 12/2004 | Markki et al. ................ 709/207 |
| 2005/0002405 A1 * | 1/2005 | Gao ............................... 370/401 |
| 2005/0047383 A1 | 3/2005 | Yoshida |
| 2005/0064873 A1 | 3/2005 | Karaoguz et al. |
| 2005/0101328 A1 | 5/2005 | Son et al. |
| 2005/0117525 A1 * | 6/2005 | Poustchi et al. .............. 370/254 |
| 2005/0190784 A1 * | 9/2005 | Stine ............................. 370/445 |
| 2006/0002383 A1 * | 1/2006 | Jeong et al. ................... 370/360 |
| 2006/0077906 A1 * | 4/2006 | Maegawa et al. ............. 370/254 |
| 2007/0058659 A1 * | 3/2007 | Ayyagari et al. .............. 370/445 |
| 2007/0070943 A1 | 3/2007 | Livet et al. |
| 2007/0072604 A1 | 3/2007 | Wang |
| 2007/0105574 A1 | 5/2007 | Gupta et al. |
| 2007/0121507 A1 * | 5/2007 | Manzalini et al. ............ 370/235 |
| 2007/0153717 A1 | 7/2007 | Tervonen et al. |
| 2007/0153876 A1 * | 7/2007 | Pi et al. ......................... 375/140 |
| 2007/0165587 A1 | 7/2007 | Choi |
| 2007/0263528 A1 | 11/2007 | Mukherjee |
| 2007/0291680 A1 | 12/2007 | Machida |
| 2008/0113615 A1 | 5/2008 | Fahldieck |
| 2008/0117807 A1 * | 5/2008 | Davidson et al. ............. 370/219 |
| 2008/0166994 A1 * | 7/2008 | Ku et al. ....................... 455/406 |
| 2008/0240060 A1 * | 10/2008 | Janakiraman et al. ........ 370/338 |
| 2009/0016219 A1 | 1/2009 | Laroia et al. |
| 2009/0016317 A1 | 1/2009 | Wu et al. |
| 2009/0059841 A1 | 3/2009 | Laroia et al. |
| 2009/0111479 A1 | 4/2009 | Yamaguchi et al. |
| 2009/0161688 A1 * | 6/2009 | Park et al. ..................... 370/441 |
| 2009/0232143 A1 | 9/2009 | Li et al. |
| 2011/0103274 A1 | 5/2011 | Vavik |

FOREIGN PATENT DOCUMENTS

| | | |
|---|---|---|
| CN | 1604685 A | 4/2005 |
| CN | 1756227 A | 4/2006 |
| CN | 1881869 A | 12/2006 |
| CN | 1889708 A | 1/2007 |
| CN | 1909718 A | 2/2007 |
| CN | 101094444 A | 12/2007 |
| CN | 101119152 A | 2/2008 |
| CN | 101232731 A | 7/2008 |
| EP | 1696684 A1 | 8/2006 |
| JP | 2002247043 A | 8/2002 |
| JP | 2003179607 A | 6/2003 |
| JP | 2007195171 A | 8/2007 |
| JP | 2009111929 | 5/2009 |
| WO | 2006033514 A2 | 3/2006 |

OTHER PUBLICATIONS

Huang et al., "Radio Resource Management of Heterogeneous Services in Mobile WiMax Systems", IEEE Wireless Communications, Feb. 2007, pp. 20-26, vol. 14 Issue. 1, IEEE Communications Society, ISSN: 1536-1284, DOI: 10.1109/MWC.2007.314547.

Taiwan Search Report—TW098107740—TIPO—Apr. 25, 2012.

\* cited by examiner

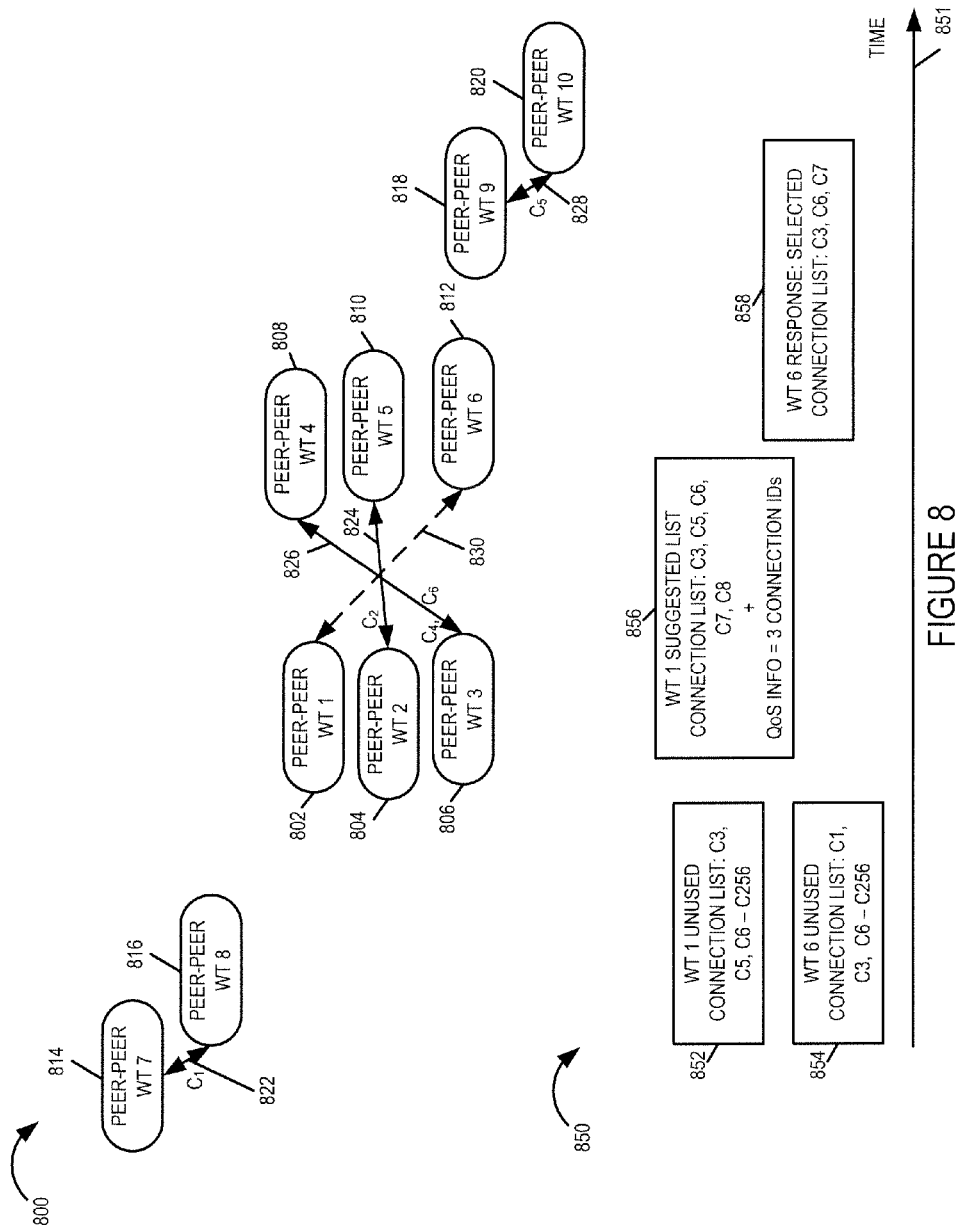

METHODS AND APPARATUS FOR ACQUIRING AND USING MULTIPLE CONNECTION IDENTIFIERS

FIELD

Various embodiments relate to wireless communications, and more particularly, to methods and apparatus for providing different levels of peer to peer communications resources through the use of connection identifiers.

BACKGROUND

Different connections in a wireless network may have different needs in terms of: type of traffic to be communicated, amount of traffic to communicate, priority of the traffic to be communicated, latency requirements, and/or error rate tolerances. In addition, different wireless terminals or users may have purchased different provisioning service level plans from a service provider. Traffic loading conditions can also be expected to vary over time and from one location to another. There is typically a fixed amount of air link resources in a local region available to be scheduled for traffic signaling.

In a peer to peer communications network such as an ad-hoc network, where a centralized control node is not available to monitor activity, establish connections, and perform overall coordination, there is a need for new and innovative methods and apparatus to support the identification of regional activity and establish connections.

In a peer to peer communications network, where boundaries are not clearly defined, one would like to be able to reuse as much of the traffic air link resources as possible in adjacent regions without creating intolerable interference levels. In systems such as ad-hoc peer to peer networks, where there is no centralized scheduling node, it becomes problematic to allocate air link resources, e.g., traffic channel air link resources in an efficient manner.

Compounding the problem of the assignment of a traffic segment in a local region to a particular connection, among which various connections concurrently desire to use the same segment, is the problem that different connections may be associated with different resource needs. Allocating the same fixed amount of resources to each connection, whether it be control resources, e.g., traffic transmission request resources, or traffic transmissions resources, e.g., traffic segments, is inefficient and wasteful.

Based on the above discussion, there is also a need for new and improved methods and apparatus for supporting differentiated qualities of service in a wireless communications system, e.g., in an ad-hoc peer to peer wireless communications system in which scheduling decisions are made in a distributed manner.

SUMMARY

Methods and apparatus related to a wireless communications system supporting the association of multiple connection identifiers with a single connection between a pair of wireless terminals are described. Such methods and apparatus are well suited for peer to peer wireless communications systems, e.g., ad hoc peer to peer wireless communications systems, wherein the assignment of connection identifiers and/or the scheduling of air link resources are performed in a distributed manner.

A differentiated quality of service is supported by assigning different numbers of connection identifiers to different connections. In some embodiments, the connection identifiers are orthogonal MAC IDs. For example, a first connection being established between a first pair of peer to peer wireless terminals is assigned a single connection identifier, while a second connection being established between a second pair of peer to peer wireless terminals is assigned multiple connection identifiers. In some embodiments, the first connection corresponds to users which anticipate a low traffic data rate over the first connection, while the second connection corresponds to users which anticipate a high traffic data rate over the second connection. In some embodiments, the first connection corresponds to users which anticipate higher priority traffic over the first connection, while the second connection corresponds to users which anticipate lower priority traffic over the second connection. In various embodiments, the number of connection identifiers assigned to a pair of wireless terminals for a connection is a function of a quality of service level associated with the connection.

In one scheme a traffic transmission request air link resource is partitioned into a fixed number of units, e.g., OFDM tone-symbols, and each unit is associated with a different connection identifier. The units of the traffic transmission request resource are prioritized. Requests carried by the units of the traffic transmission request resource correspond to the same peer to peer traffic data segment. In some such embodiments, the transmission request unit associated with a particular connection identifier varies from one traffic slot to another, thereby providing diversity. The decision as to whether a connection, which would like to use a traffic segment, is permitted to proceed is made in a distributed manner with both potential transmitter and potential receiver having input as to whether or not to yield the traffic transmission resource to another connection or to proceed. In such an embodiment, over time, a second connection, which has been allocated more connection identifiers than a first connection, is statistically more likely to be able to use the traffic transmission resource, with other conditions remaining constant.

In some embodiments, the allocation of connection identifiers is performed in a distributed manner in which handshake signaling occurs between a wireless terminal pair seeking to establish a connection. For example, a first device of the pair forms a first list of potential connection identifiers based on its understanding of currently available unused connection identifiers, and the first device communicates at least a portion of the first list to the second device of the pair as a suggested list of connection identifiers. The second device of the pair has also formed a list of currently available unused connection identifiers based on its measurements and selects one or more elements from its list that are also on received suggested list of connection identifiers. The number of selected connection identifiers to be used for the connection is, in some embodiments, determined as a function of at least one of: quality of service information communicated to the second device, an anticipated traffic data rate for the connection, a priority level associated with the connection, and a priority level associated with one of the first and second devices. The selected one or more connection identifiers to be used for the connection is communicated from the second device to the first device. In one embodiment, the handshake signaling used to reach agreement of the connection identifier or identifiers to be associated with a connection is communicated during a paging interval, e.g., using a paging channel as part of a multi-step paging process.

An exemplary method operating a first communications device to communicate with a second device, in a system supporting multiple communications connections comprises: monitoring a connection identifier broadcast interval to identify unused connection identifiers; transmitting a set of available connection identifiers from the identified unused connection identifiers to the second device; receiving from the second device a subset of said transmitted set of available connection identifiers, said subset of connection identifiers including identifiers to be used for a communications connection between said first and second devices.

An exemplary first communications device comprises: a connection availability signal generation module for generating a signal conveying information identifying a set of available connection identifiers; a wireless transmitter module for transmitting said generated signal conveying information identifying a set of available connection identifiers to a second device; and a wireless receiver module for receiving from the second device information indicating a subset of said transmitted set of available connection identifiers, said subset of connection identifiers including identifiers to be used for a communications connection between said first and second devices.

While various embodiments have been discussed in the summary above, it should be appreciated that not necessarily all embodiments include the same features and some of the features described above are not necessary but can be desirable in some embodiments. Numerous additional features, embodiments and benefits of various embodiments are discussed in the detailed description which follows.

BRIEF DESCRIPTION OF THE FIGURES

FIG. 8 is drawing illustrating various aspects of connection identifier assignment in accordance with one exemplary embodiment.

DETAILED DESCRIPTION

Figure 1:
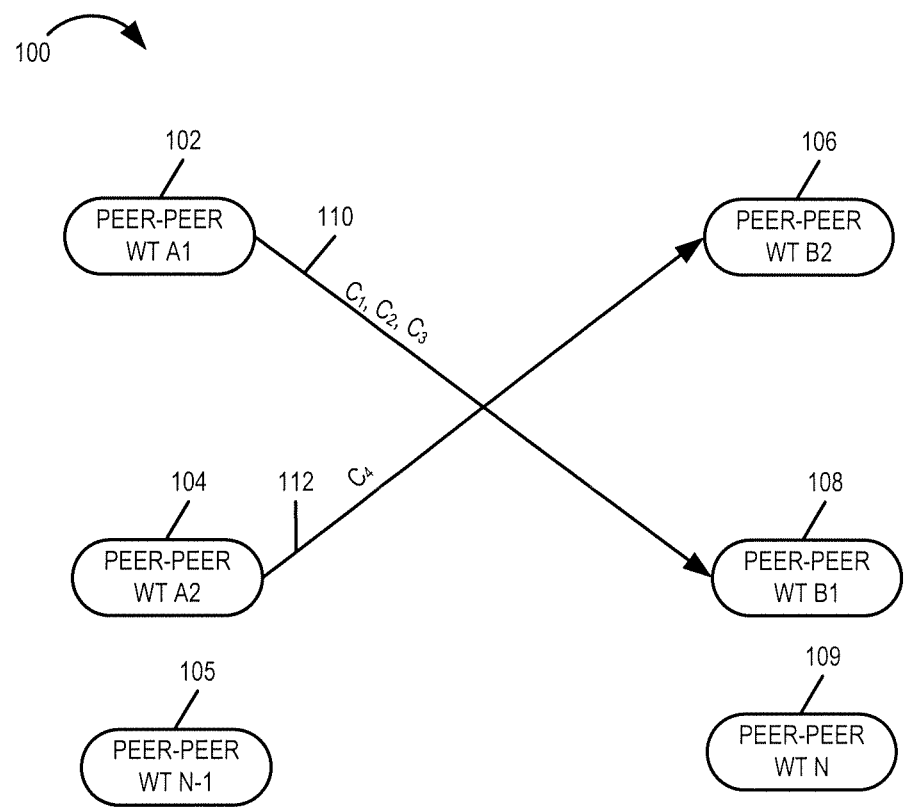
FIG. 1 is a drawing of an exemplary wireless communications system, e.g., an ad hoc peer to peer wireless communications system, in accordance with an exemplary embodiment.

FIG. 1 is a drawing of an exemplary wireless communications system 100, e.g., an ad hoc peer to peer wireless communications system, in accordance with an exemplary embodiment. Exemplary communications system 100 includes a plurality of wireless terminals (peer to peer wireless terminal A1 102, peer to peer wireless terminal A2 104, peer to peer wireless terminal B1 108, peer to peer wireless terminal B2 106, peer to peer wireless terminal N-1 105, . . . , peer to peer wireless terminal N 1109). A wireless terminal may, and sometimes does, establish a connection with another wireless terminal. One or more connection identifiers are associated with a connection between a pair of wireless terminals. As illustrated in FIG. 1, WT A1 102 has a connection 110 with WT B1 108 and the connection 110 is associated with three connection identifiers ($C_1$, $C_2$, $C_3$). WT A2 104 has a connection 112 with WT B2 106, and the connection 112 is associated with a single connection identifier ($C_4$). At a different time different connections are established and maintained between different pairs of wireless terminals. The number of connection identifiers associated with a specific pair of wireless terminal having a connection, in some embodiments, varies over time.

Figure 2:
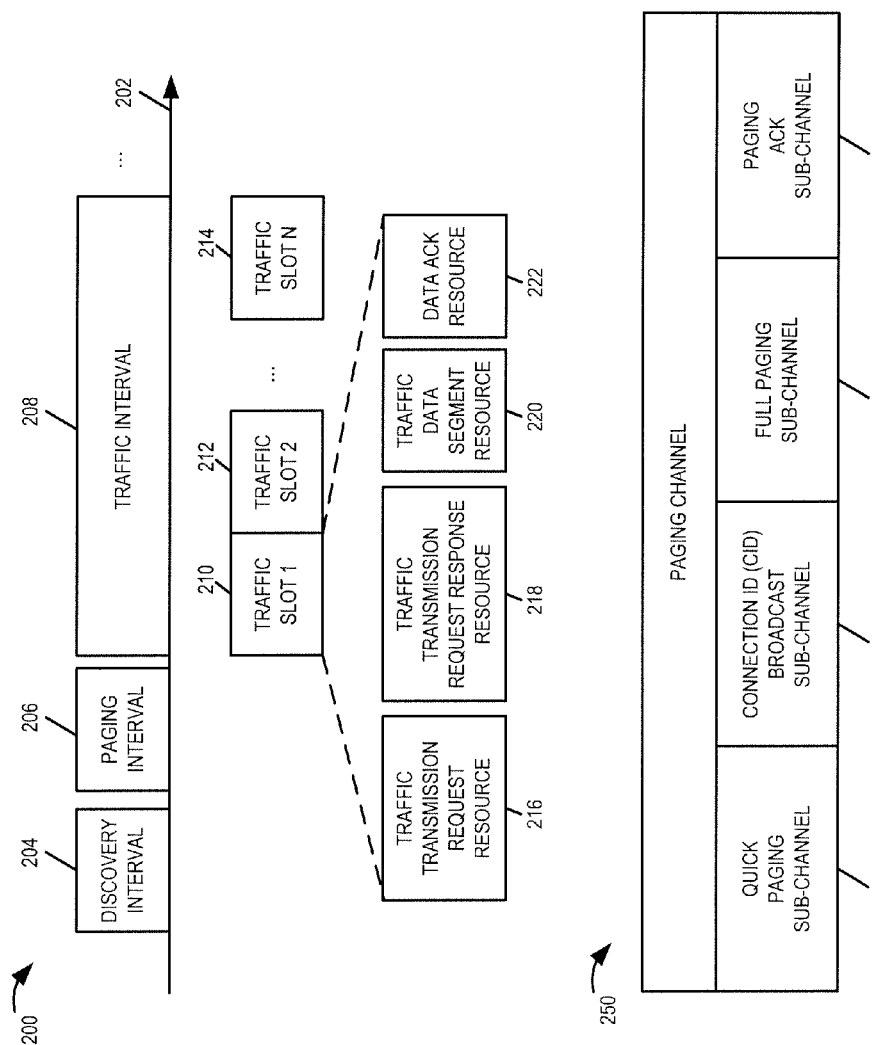
FIG. 2 is a drawing illustrating an exemplary recurring timing structure, associated exemplary air link resources, and channel information.

FIG. 2 is a drawing illustrating an exemplary recurring timing structure, exemplary air link resources and channel information. The structure of FIG. 2 may be applicable to the system of FIG. 1. Exemplary timing structure 200 of FIG. 2 includes a discovery interval 204, a paging interval 206, and a traffic interval 208. During discovery interval 204 a peer to peer wireless terminal transmits a signal to make known its presence in the region, e.g., the peer to peer wireless terminal transmits a beacon signal used for identification, and the peer to peer wireless terminal monitors for identification signals from other peer to peer devices in its vicinity, e.g., other peer to peer beacon signals. In the discovery interval, a wireless terminal forms a list of discovered other wireless terminals in its vicinity.

In paging interval 206 a wireless terminal may, and sometimes does, establish a connection with another wireless terminal with which it would like to communicate traffic signals. In this exemplary embodiment during the paging interval 206, information is communicated using paging channel 250. The paging channel 250 includes a quick paging sub-channel portion 254, a connection ID (CID) broadcast sub-channel portion 256, a full paging sub-channel portion 258 and a paging acknowledgement sub-channel portion 260.

Consider that exemplary WT A has discovered the presence of exemplary WT B during the discovery interval and that WT A seeks to communicate traffic to WT B. WT A sends a paging request signal to WT B using quick paging sub-channel 254 during an interval associated with quick paging. In some embodiments, the quick paging signal is a single tone signal, e.g., a single tone signal based on a discovery ID associated with WT B.

Then, in an interval associated with the CID broadcast sub-channel 256, both WT A and WT B monitor for connection ID signals from other wireless terminals which have current active connections. For example, during the CID broadcast interval, every active connection being used broadcasts a connection identifier. WT A and WT B which have been monitoring for the broadcast CIDs, each prepare a list of CIDs which are in use and then form a list of unused CIDs which are available. Since WT A and WT B are at different locations, and may be subjected to interference from different connections, the list of unused connection identifiers formed by WT A may, and sometimes does, differ from the list of unused connection identifiers that WT B forms. In some embodiments, connection identifiers are MAC identifiers.

WT A identifies a set of potential connection identifiers that it thinks may be suitable for use with WT B. The set of potential connection identifiers includes identifiers which it determined to be unused based on received signals from the CID broadcast. Then, WT A transmits a signal using the full paging sub-channel 258 during an interval associated with full paging, the transmitted signal communicating the generated set of potential connection identifiers. In some embodiments, the full paging signal also communicates information used in determining a number of connection identifiers which are to be associated with the connection. In some such embodiments, the information used in determining a number of connection identifiers is quality of service information. WT B receives the full paging signal from WT A, and forms a set of connection identifier which are to be associated with the connection, members of the set of connection identifiers to be associated with the connection being included in the set of potential connection identifiers communicated via the full paging signal and being also included in WT B's list of unused connection identifiers. Then, WT B generates a paging acknowledgment signal, conveying its list of one or more connection identifiers to be associated with the connection, and transmits the generated signal to WT A using the paging acknowledgment sub-channel 260 during a paging acknowledgment sub-channel interval.

Traffic interval 208 includes a plurality of traffic slots (traffic slot 1 210, traffic slot 2 212, . . . , traffic slot N 214). Traffic slot 1 210 includes a traffic transmission request resource 216, a traffic transmission request response resource 218, a traffic data segment resource 220 and a data acknowledgment resource 222. Active connection identifiers include, e.g., connection identifiers for which a CID signal was broadcast using the CID broadcast sub-channel 256 and connection identifiers which were added via paging acknowledgement sub-channel signaling 260. The active connection identifiers are utilized during the traffic interval.

Each of the connection identifiers is associated with a portion of traffic transmission request resource 216, e.g., an OFDM tone-symbol to be used for signaling a request to transmit data using traffic data segment resource. Each of the connection identifiers is associated with a portion of traffic transmission request response resource 218, e.g., an OFDM tone-symbol to be used for signaling an RX echo signal, which is a positive response to a traffic transmission request. Traffic data segment resource 220 is used to carry peer to peer user data traffic signals for a connection, if the transmission request is granted and provided the transmitting device decided not to yield the resource. Data acknowledgement resource 222 is used to carry a traffic data acknowledgment signal in response to traffic data communicated using traffic data segment resource 220.

Figure 3:
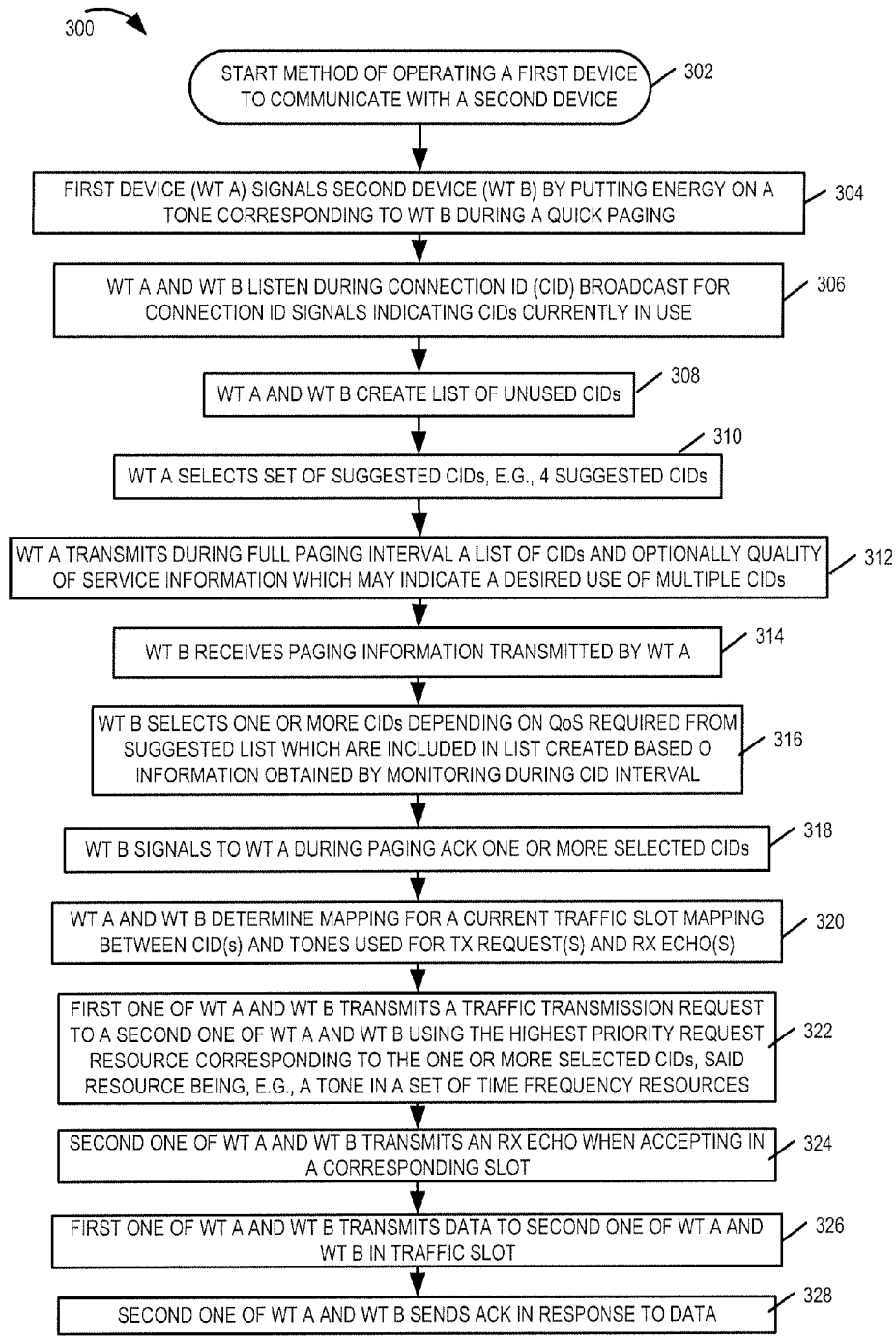
FIG. 3 is a flowchart of an exemplary method of operating a first device to communicate with a second device in accordance with one exemplary embodiment.

FIG. 3 is a flowchart of an exemplary method of operating a first device to communicate with a second device in accordance with one exemplary embodiment. The first device, wireless terminal A, is, e.g., a first peer to peer communications device and the second device, wireless terminal B, is, e.g., a second peer to peer communications device, where WT A and WT B are part of an ad hoc network.

Operation starts in step 302 where the first and second devices are powered on and initialized. The first and second devices (WT A and WT B) synchronize in accordance with a recurring peer to peer timing structure, e.g., the recurring timing structure of FIG. 2. The first and second devices (WT A and WT B) participate in discovery, and the first device (WT A) recognizes that the second device (WT B) is in its vicinity, while the second device (WT B) recognizes that the first device (WT A) is in its vicinity. Consider that the first device (WT A) desires to page the second device (WT B) and establish an active connection. Operation proceeds from step 302 to step 304.

In step 304, the first device (WT A) signals the second device (WT B) by putting energy on a tone corresponding to WT B during quick paging. Consider that WT B recovers the signals and recognizes that it is being paged. Operation proceeds from step 304 to step 306.

In step 306, WT A and WT B listen during a connection identification (CID) broadcast for connection ID signals indicating CIDs which are currently in use. WT A and WT B each make a list of detected active CIDs. Operation proceeds from step 306 to step 308. In step 308 WT A and WT B each create a list of unused connection IDs. WT A and WT B are aware of the set of designated CIDs. WT A forms its list of unused CIDs by removing its detected CIDs (of step 306) from the set of designated CIDs. Similarly, WT B forms its list of unused CIDs by removing its detected CIDs (of step 306) from the set of designated CIDs. It should be noted that WT A and WT B may, and sometimes does arrive at different sets of unused CIDs, since WT A and WT B may be situated at different locations and detect different CID signals. Operation proceeds from step 308 to step 310.

In step 310 WT A selects a set of suggested CIDs of which one or more may be used for a connection between WT A and WT B, the selection being from WT A's list of unused CIDs. For example, in step 308 WT A may have formed a list identifying eight unused CIDs, and in step 310, WT A forms a list identifying at most 4 suggested CIDs from the 8 unused CIDs. In step 310 the WT A generates a full paging interval signal to convey its list of suggested CIDs for the connection between WT A and WT B. In some embodiments, QoS information is included with the list of suggested CIDs in the generated signal. Operation proceeds from step 310 to step 312.

In step 312, WT A transmits during a full paging interval the generated list of suggested CIDs, and optionally includes quality of service information which may indicate a desired use of multiple CIDs. Operation proceeds from step 312 to step 314.

In step 314, WT B receives the paging information transmitted by WT A in step 312. Then, in step 316, WT B selects one or more CIDs depending on the QoS required from the suggested list of CIDs which has been communicated. The selected CIDs are CIDs which are included in both the suggested list of CIDs from WT A and the list of unused CIDs which WT B formed based on received broadcast CIDs detected by WT B during the CID broadcast interval. Operation proceeds from step 316 to step 318.

In step 318, WT B signals to WT A during a paging acknowledgment interval the one or more selected CIDs from step 316. WT B receives the paging acknowledgment signal and identifies the one or more selected CIDs to be used for the connection between WT A and WT B. Operation proceeds from step 318 to step 320.

In step 320, WT A and WT B determine mapping for a current traffic slot between CIDs and tones used for traffic transmission requests and traffic transmission request responses, e.g., RX echos. The mapping between a connection identifier and request/request response resource may, and sometimes does, change from one traffic slot to the next, e.g., in accordance with an implemented hopping pattern known to both WT A and WT B. This hopping provides diversity, e.g., increasing the likelihood that a transmission traffic request corresponding to a connection identifier will have an opportunity to transmit traffic during at least one of the traffic slots in the traffic interval. Priorities are associated with positions within the traffic transmission request resource; therefore, moving a connection identifier to a different traffic transmission request resource tone-symbol from one traffic slot to another, in accordance with hopping, changes request priorities. Operation proceeds from step 320 to step 322.

In step 322 a first one of WT A and WT B transmits a traffic transmission request to a second one of WT A and WT B using the highest priority request resource corresponding to the one or more selected CIDs, said resource used for transmission being a tone in a set of time frequency resources for the duration of an OFDM symbol transmission time interval. Operation proceeds from step 322 to step 324.

In step 324, the second one of WT A and WT B transmits an RX echo signal using an air link resource in a traffic transmission request response interval which corresponds to the request resource. The decision to transmit an RX echo signal represents a decision to accept the received traffic transmission request directed to the second one of WT A and WT B, which was transmitted in step 322. If the second one of WT A and WT B had instead decided not to accept the request, the second one of WTA and WT B would refrain from signaling an RX echo signal. Operation proceeds from step 324 to step 326.

In step 326, the first one of WT A and WT B, which has received the transmitted RX echo of step 324, transmits data to the second one of WT A and WT B in the traffic slot, e.g., using traffic data segment resource 220. Operation proceeds from step 326 to step 328

In step 328, the second one of WT A and WT B, sends an Acknowledgment in response to the received traffic data, e.g., using data ack resource 222.

Note that flowchart 300 has been presented for the case where the decision is to proceed with the establishment of a connection, selection and agreement on one or more connection identifiers to use for the connection is possible and occurs, and traffic transmission request/response signals results in the communications of traffic signals between the first and second wireless devices. Operation may deviate from the positive results flowchart of FIG. 3 based on any of a number of conditions, e.g., no connection identifiers are currently available, there is no overlap between WT A's list of unused connection identifiers and WT B's list of unused connection identifiers, the WT which would like to request a traffic transmission resource decides to refrain from sending a request, e.g., due to a higher priority request which it detected. The WT which is intended to receive the traffic transmission signals decides to perform receiver yielding and not send an RX echo, etc.

Steps 322 to 328, in some embodiments, are performed multiple times, e.g., corresponding to a plurality of traffic slots during which at least one one of WT A and WT B desires to transmit traffic signals. For example, the same one or more CIDs signaled from WT B to WT A in step 318 are to be used for the connection between WT A and WT B during a plurality of traffic slots, e.g., (traffic slot 1 210, traffic slot 2 212, traffic slot N 214).

Figure 4:
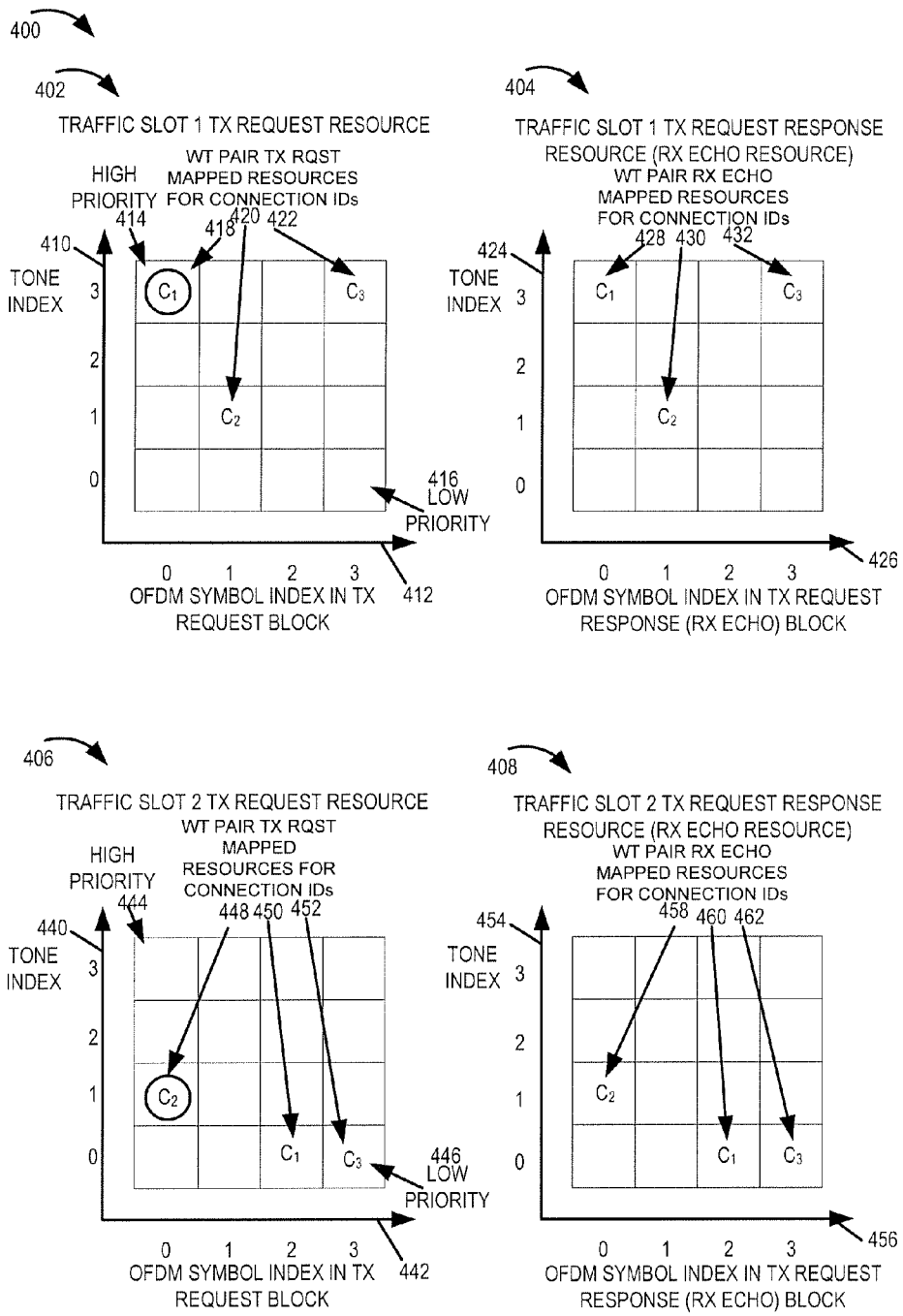
FIG. 4 is a drawing illustrating exemplary connection identifier mapping to air link resources, and the mapping changes between successive traffic slots in accordance with a hopping scheme.

FIG. 4 is a drawing 400 illustrating exemplary connection identifier mapping to air link resources, and the mapping changes between successive traffic slots in accordance with a hopping scheme. In FIG. 4, one may assume that a connection, e.g., between peer to peer WT A and peer to peer WT B has been established, e.g., during a paging interval, and that three connection identifiers ($C_1$, $C_2$, $C_3$) are now associated with the connection.

Drawing 402 illustrates an exemplary traffic slot 1 transmission request resource which includes 16 OFDM tone-symbols, each tone-symbol associated with a connection identifier in accordance with a predetermined mapping. Vertical axis 410 represents tone index, which in this example, ranges from 0 to 3. Horizontal axis 412 represents OFDM symbol index in the transmission request resource block 412, which ranges from 0 to 3. Note that low ranges of tone indexes and symbol indexes are being used for the purposes of illustration; however, the actual number of tones used and/or symbols used may be other than 4. For example, in one exemplary embodiment there are 256 distinct units, e.g., OFDM tone-symbols available in a transmission request resource block to carry requests, e.g., corresponding to 256 different MAC IDs.

In this example, each OFDM tone-symbol of the TX request resource is associated with a different priority level. OFDM tone-symbols corresponding to lower OFDM symbol indexes have higher priority than OFDM tone-symbols corresponding to higher OFDM symbol indexes. For a give OFDM symbol index, an OFDM tone-symbol corresponding to a higher index tone has higher priority than an OFDM tone-symbol corresponding to a lower index tone. OFDM tone-symbol 414 is the tone-symbol having the highest request priority, while OFDM tone-symbol 416 is the tone-symbol having the lowest request priority.

In this example, there are three connection identifiers corresponding to the connection between WT A and WT B, where connection identifier $C_1$ is mapped to OFDM tone-symbol 414, connection identifier $C_2$ is mapped to OFDM tone-symbol 420, and connection identifier $C_3$ is mapped to OFDM tone-symbol 422. It should be noted that of the three connection identifiers $C_1$ is associated with the highest priority, and therefore, if WT A decides to send a traffic transmission request to WT B for traffic slot 1, WT A will use OFDM tone-symbol 414, as indicated by the circle around $C_1$.

Drawing 404 illustrates an exemplary traffic slot 1 transmission request response resource, e.g. an RX echo resource, which includes 16 OFDM tone-symbols, each tone-symbol associated with a connection identifier in accordance with a predetermined mapping. Vertical axis 424 represents tone index, which in this example, ranges from 0 to 3. Horizontal axis 426 represents OFDM symbol index in the transmission request response resource block, which ranges from 0 to 3.

In this example, there are three connection identifiers corresponding to the connection between WT A and WT B, where connection identifier $C_1$ is mapped to OFDM tone-symbol 428, connection identifier $C_2$ is mapped to OFDM tone-symbol 430, and connection identifier $C_3$ is mapped to OFDM tone-symbol 432, which are designated to be used to transmit request response signals, e.g., an RX echo signal from WT B to WT A. For example, consider that WT A has transmitted a traffic transmission request on resource 414 (associated with connection identifier $C_1$), then WT B, if it decides to acquiesce to the request, transmits a RX echo signal on OFDM tone-symbol 428 (associated with connection identifier $C_1$).

Drawing 406 illustrates an exemplary traffic slot 2 transmission request resource which includes 16 OFDM tone-symbols, each tone-symbol associated with a connection identifier in accordance with a predetermined mapping. Vertical axis 440 represents tone index, which in this example, ranges from 0 to 3. Horizontal axis 442 represents OFDM symbol index in the transmission request resource block, which ranges from 0 to 3. Note that low ranges of tone indexes and symbol indexes are being used for the purposes of illustration; however, the actual number of tones used and/or symbols used may be other than 4. In this example, each OFDM tone-symbol of the TX request resource is associated with a different priority level. OFDM tone-symbols corresponding to lower OFDM symbol indexes have higher priority than OFDM tone-symbols corresponding to higher OFDM symbol indexes. For a given OFDM symbol index, an OFDM tone-symbol corresponding to a higher index tone has higher priority than an OFDM tone-symbol corresponding to a lower index tone. OFDM tone-symbol 444 is the tone-symbol having the highest request priority, while OFDM tone-symbol 446 is the tone-symbol having the lowest request priority.

In this example, there are three connection identifiers corresponding to the connection between WT A and WT B, where connection identifier $C_1$ is mapped to OFDM tone-symbol 450, connection identifier $C_2$ is mapped to OFDM tone-symbol 448, and connection identifier $C_3$ is mapped to OFDM tone-symbol 452. It should be noted that of the three connection identifiers $C_2$ is associated with the highest priority, and therefore, if WT A decides to send a traffic transmission request to WT B for traffic slot 2, WT A will use OFDM tone-symbol 448, as indicated by the circle around $C_2$.

Drawing 408 illustrates an exemplary traffic slot 2 transmission request response resource, e.g. an RX echo resource, which includes 16 OFDM tone-symbols, each tone-symbol associated with a connection identifier in accordance with a predetermined mapping. Vertical axis 454 represents tone index, which in this example, ranges from 0 to 3. Horizontal axis 456 represents OFDM symbol index in the transmission request response resource block, which ranges from 0 to 3.

In this example, there are three connection identifiers corresponding to the connection between WT A and WT B, where connection identifier $C_1$ is mapped to OFDM tone-symbol 460, connection identifier $C_2$ is mapped to OFDM tone-symbol 458, and connection identifier $C_3$ is mapped to OFDM tone-symbol 462, which are designated to be used to transmit request response signals, e.g., an RX echo signal from WT B to WT A. For example, consider that WT A has transmitted a traffic transmission request on resource 448 (associated with connection identifier $C_2$), then WT B, if it decides to acquiesce to the request, transmits a RX echo signal on OFDM tone-symbol 458 (associated with connection identifier $C_2$).

Figure 5:
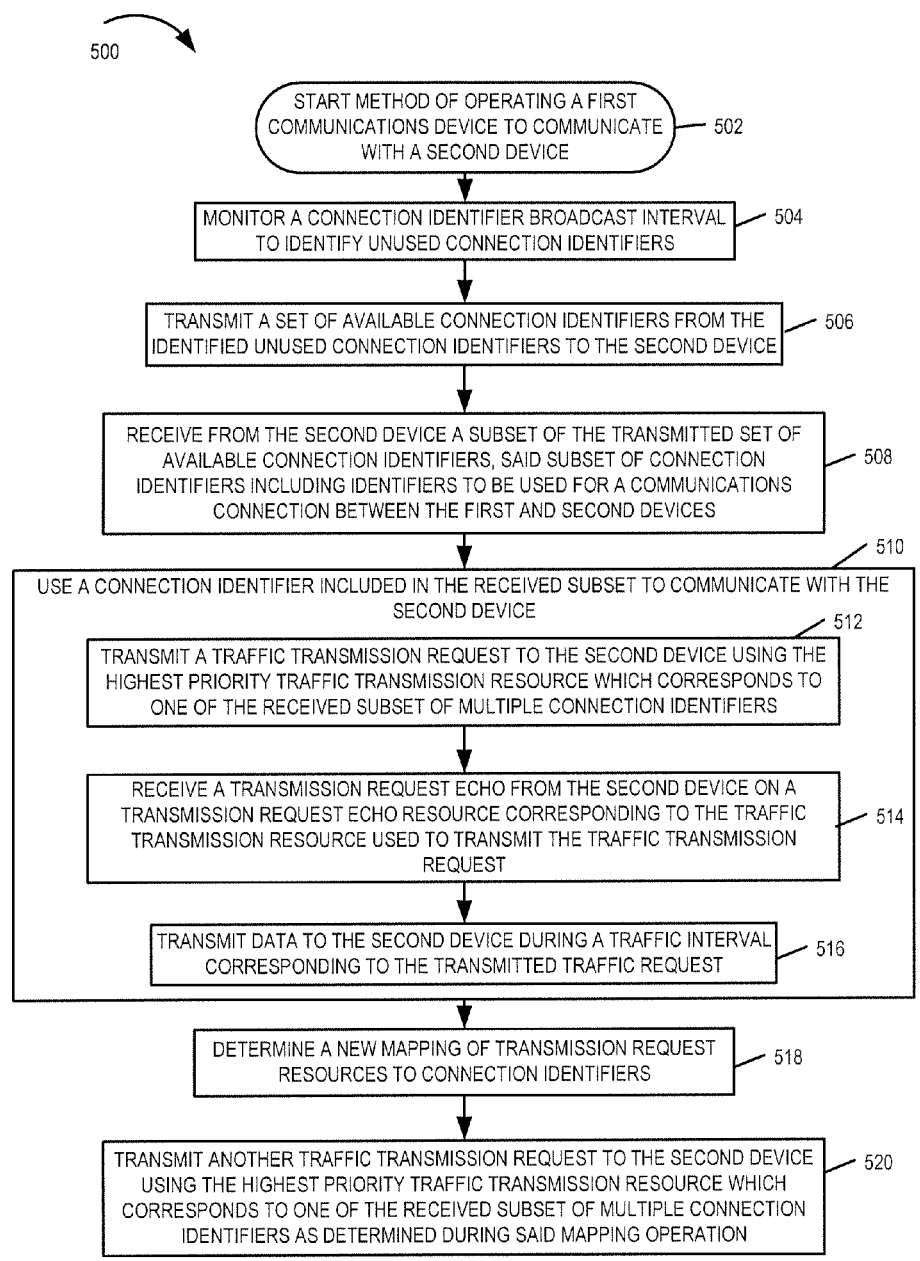
FIG. 5 is a drawing of an exemplary method of operating a first communications device to communicate with a second communications device in accordance with an exemplary embodiment.

FIG. 5 is a drawing of an exemplary method of operating a first communications device to communicate with a second communications device in accordance with an exemplary embodiment. The first and second communications devices are, e.g., peer to peer communications devices, in an ad-hoc peer to peer communications network. Operation of the exemplary method starts in step 502, where the first communications device is powered on and initialized and proceeds to step 504.

In step 504, the first communications device monitors a connection identifier broadcast interval to identify unused connection identifiers. Operation proceeds from step 504 to step 506.

In step 506 the first communications device transmits a set of available connection identifiers from the identified unused connection identifiers to the second device. Then, in step 508 the first device receives from the second device a subset of the transmitted set of available connection identifiers, the subset of connection identifiers including identifiers to be used for a communications connection between the first and second devices. In some embodiments, the connection is a bi-directional connection. The received subset may, and sometimes does, include multiple connection identifiers corresponding to a single communications link between the first and second devices. In some embodiments, different traffic transmission resources are associated with different connection identifiers, the different traffic transmission resources having different priorities. In some embodiments, transmission request resources are tone-symbols in a set of time-frequency resources. Operation proceeds form step 508 to step 510.

In step 510 the first device uses a connection identifier in the received subset to communicate with the second device. Step 510 includes sub-steps 512, 514 and 516. In sub-step 512 the first device transmits a traffic transmission request to the second device using the highest priority traffic transmission request resource which corresponds to one of the received subset of multiple connection identifiers. Operation proceeds from step 512 to step 514. In step 514 the first device receives a transmission request echo from the second device on a transmission request echo resource corresponding to the traffic transmission resource used to transmit the traffic transmission request. Then, in step 516 the first device transmits data to the second device during a traffic interval corresponding to the transmitted traffic request. Operation proceeds from step 510 to step 518.

In step 518 the first device determines a new mapping of transmission request resources to connection identifiers. Then, in step 520 the first device transmits another traffic transmission request to the second device using the highest priority traffic transmission resource which corresponds to one of the received subset of multiple connection identifiers as determined during the mapping operation.

Figures 6, 6A:
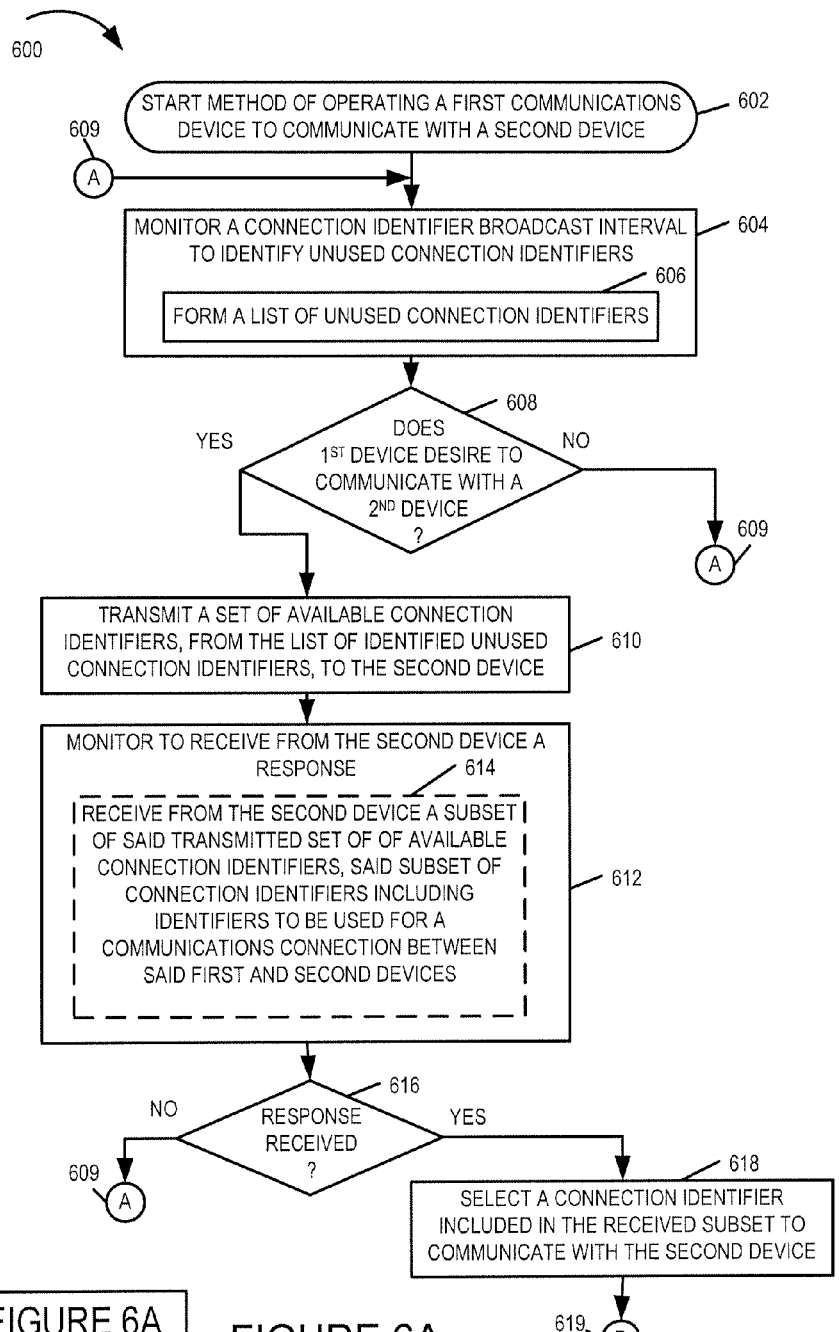
FIG. 6 comprising the combination of FIG. 6A
Figure 6B:
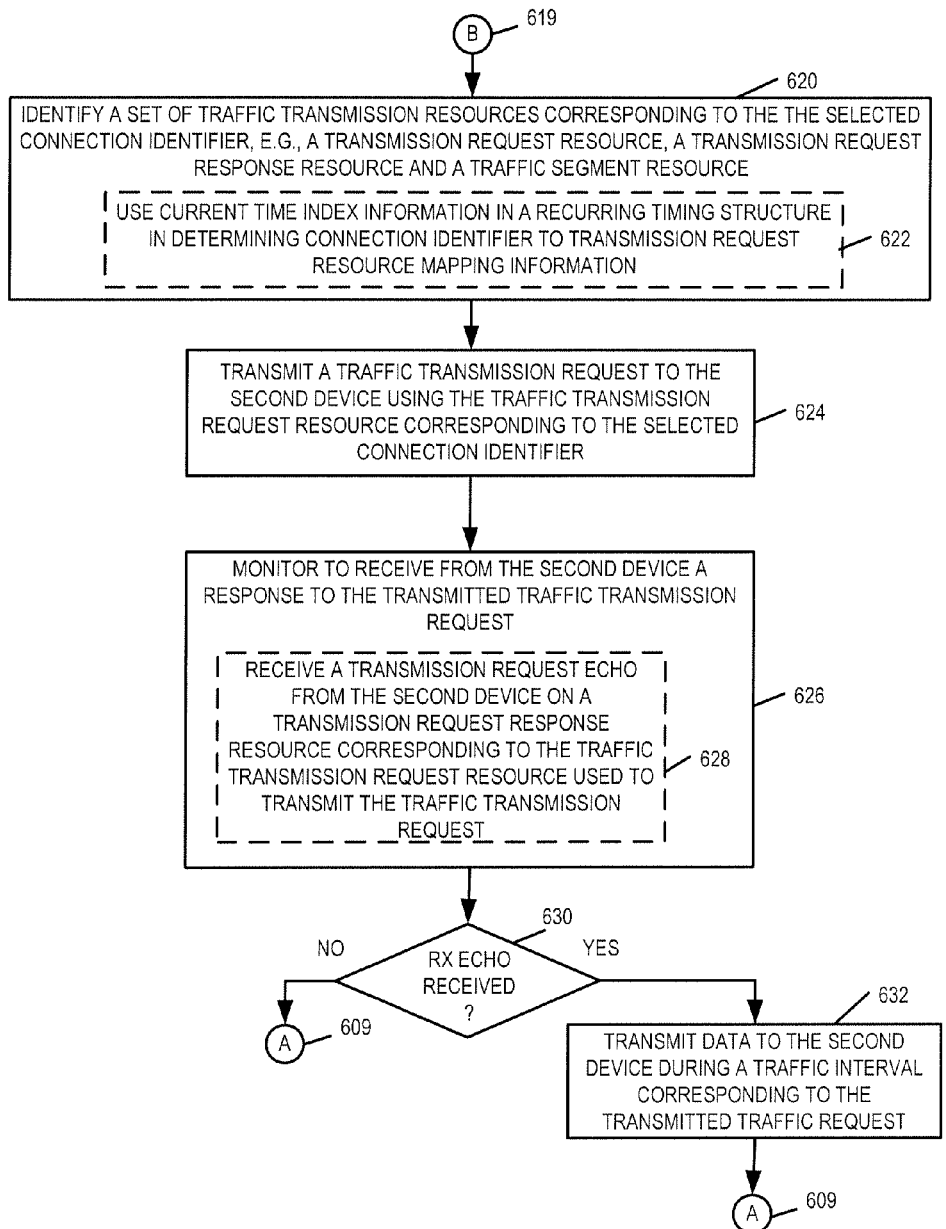
FIG. 6B is a flowchart of an exemplary method of operating a first wireless communications device to communicate with a second wireless communications device.

FIG. 6 comprising the combination of FIG. 6A and FIG. 6B is a flowchart 600 of an exemplary method of operating a first wireless communications device to communicate with a second wireless communications device. The first and second wireless communications devices are, e.g., peer to peer communications devices in an ad-hoc network following a recurring peer to peer timing structure in the network. Operation starts in step 602, where the first communications device is powered on and initialized and proceeds to step 604. In step 604, the first communications device monitors a connection identifier broadcast interval to identify unused connection identifiers. Step 604 includes sub-step 606 in which the first device forms a list of unused connection identifiers. Operation proceeds from step 604 to step 608.

In step 608 the first communications device makes a decision as to whether it desires to communicate with a second communications device. If the first device does not wish to communicate with a second device, then, operation proceeds from step 608 via connecting node A 609 to step 604 for monitoring during the next connection identifier broadcast interval. However, if the first device wishes to communicate with the second device, then operation proceeds from step 608 to step 610.

In step 610, the first device transmits a set of available connection identifiers, from the list of identified unused connection identifiers, to the second device. Then, in step 612, the first communications device monitors to receive a response from the second device. Step 612 includes, at times, sub-step 614, in which the first communications device receives from the second device a subset of the transmitted set of available connection identifiers, said subset of connection identifiers including identifiers to be used for a communications connection between the first and second devices. In some embodiments, the connection is a bidirectional connection. In some embodiments, the received subset may, and sometimes does, include multiple connection identifiers corresponding to a single communications link between the first and second devices. In various embodiments, different traffic transmission resources are associated with different connection identifiers, and the different traffic transmission resources have different priorities. Operation proceeds from step 612 to step 616.

In step 616 the first communications device determines if a response was received from the second device. If a response was not received, then operation proceeds from step 616 via connecting node A 609 to step 604 where the first communications device monitors during the next connection identifier broadcast interval. However, in step 616 if the first communications device determines that a response was received from the second device, then operation proceeds from step 616 to step 618.

In step 618, the first device selects a connection identifier included in the received subset to communicate with the second device. The selected connection identifier is subsequently used to communicate with the second device, e.g., in steps 624, 626 and/or 632. In some embodiments, the connection identifier which is selected, is selected as a function of priority information and corresponds to the highest priority traffic transmission resource of the received subset of multiple connection identifiers. Operation proceeds from step 618 via connecting node B 619 to step 620. In step 620, the first communications device identifies a set of traffic transmission resources corresponding to the selected connection identifier, e.g., a transmission request resource, a transmission request response resource and a traffic segment resource. In some embodiments, different traffic transmission resources are associated with different connection identifiers, the different traffic transmission resources having different priorities. In some embodiments, transmission request resources are tone-symbols in a set of time-frequency resources. In some embodiments, step 620 includes sub-step 622. In sub-step 622 the first communications device uses current time index information in a recurring timing structure in determining connection identifier to transmission request resource mapping information. Thus mapping of transmission request resources to connection identifiers, in some embodiments, change over time, e.g., to provide diversity.

Operation proceeds from step 620 to step 624. In step 624 the first device transmits a traffic transmission request to the second device using the traffic transmission request resource corresponding to the selected connection identifier. Then, in step 626 the first communications device monitors to receive a response to the transmitted traffic transmission request from the second device. Step 626 may, and sometimes does, include sub-step 628. In sub-step 628 the first communications device receives a transmission request echo from the second device on a transmission request response resource corresponding to the traffic transmission request resource used to transmit the traffic transmission request. Operation proceeds from step 626 to step 630.

In step 630 the first communications device determines if an RX echo signal was received from the second communications device, e.g., communicating a positive response to the traffic transmission request. If an RX echo signal was not received, then operation proceeds from step 630 via connecting node A 609 to step 604 for monitoring during the next connection identifier broadcast interval. However, if an RX echo signal was received, then operation proceeds from step 630 to step 632, in which the first communications device transmits data to second device during a traffic interval corresponding to the transmitted traffic request. Operation proceeds from step 632 via connecting node A 609 to step 604.

Figure 7:
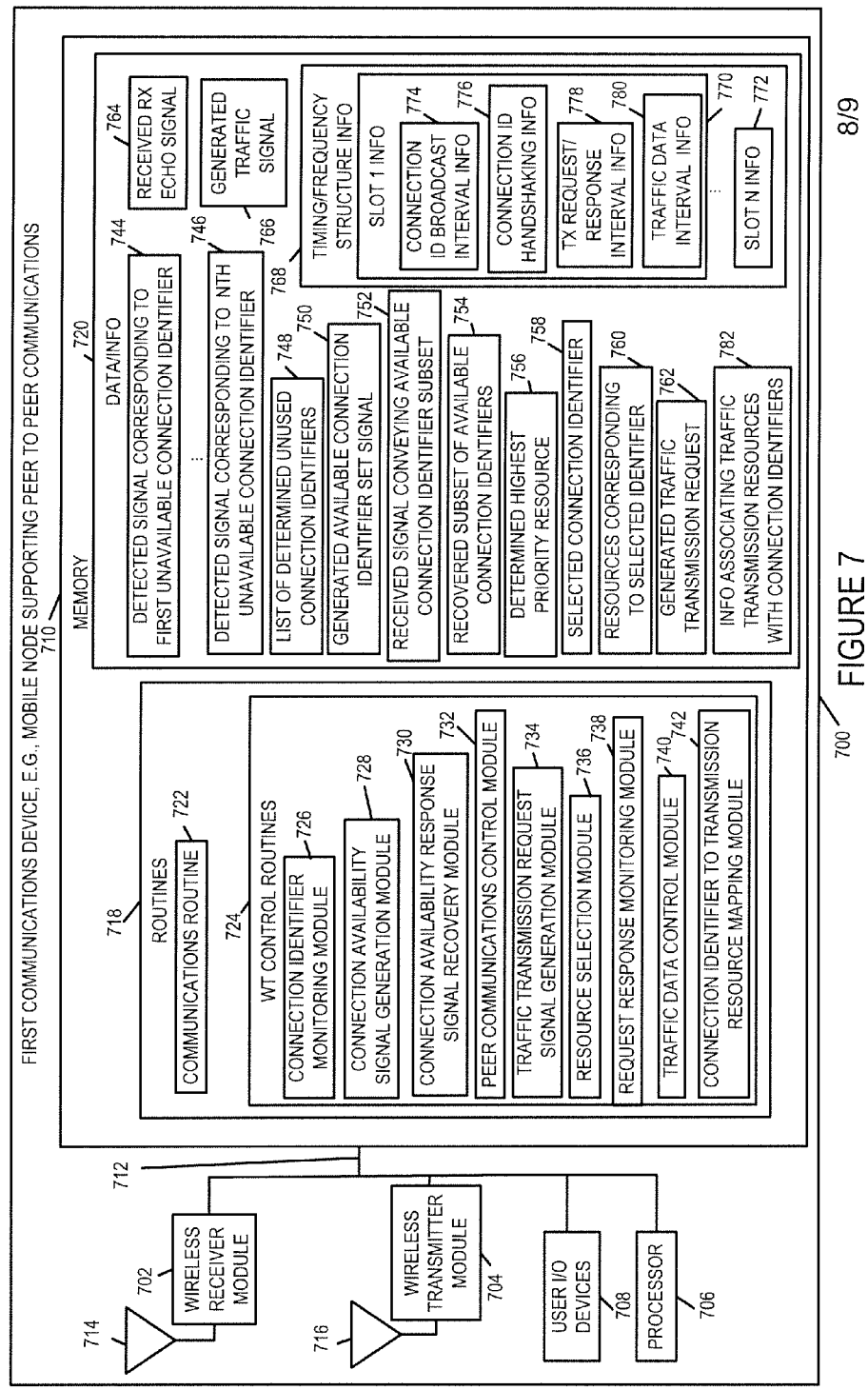
FIG. 7 is a drawing of an exemplary first communications device, e.g., a mobile node supporting peer to peer communications in accordance with an exemplary embodiment.

FIG. 7 is a drawing of an exemplary first communications device, e.g., a mobile node supporting peer to peer communications in accordance with an exemplary embodiment. Exemplary first communications device 700 includes a wireless receiver module 702, a wireless transmitter module 704, user I/O devices 708, a processor 706, and memory 710 coupled together via a bus 712 over which the various elements may interchange data and information.

Memory 710 includes routines 718 and data/information 720. The processor 706, e.g., a CPU, executes the routines 718 and uses the data/information 720 in memory 710 to control the operation of the communications device 700 and implement methods, e.g., the method of flowchart 300 of FIG. 3, the method of flowchart 500 of FIG. 5 or the method of flowchart 600 of FIG. 6.

Wireless receiver module 702, e.g., an OFDM receiver, is coupled to receive antenna 714 via which the communications device 700 receives signals from other peer to peer communications devices. Received signals include, e.g., connection identifier usage signals, e.g., signals 744 and 746, connection availability response signals, e.g., signal 752, and transmission request response signals, e.g., signal 764.

Wireless transmitter module 704, e.g., an OFDM transmitter, is coupled to transmit antenna 716 via which the communications device 700 transmits signals to other peer to com-munications devices. In some embodiments, the same antenna is used for the receiver and the transmitter. Transmitted signals include connection availability signals, e.g., signal 750, traffic transmission request signals, e.g., signal 762, and traffic signals, e.g., signal 766.

Routines 718 include a communications routine 722 and wireless terminal control routines 724. The communications routine 722 implements the various communications protocols used by the communications device 700. The wireless terminal control routines 724 include a connection identifier monitoring module 726, a connection availability signal generation module 728, a connection availability response signal recovery module 730, a peer communications control module 732, a traffic transmission request signal generation module 734, a resource selection module 736, a request response monitoring module 738, a traffic data control module 740 and a connection identifier to transmission resource mapping module 742.

Data/information includes a plurality of detected signals corresponding to unavailable connection identifiers (detected signal corresponding to a first unavailable connection identifier 744, . . . , detected signal corresponding to an Nth unavailable connection identifier 746), a list of determined unused connection identifiers 748, a generated available connection identifier set signal 750, a received signal conveying available connection identifier subset information 752, a recovered subset of available connection identifiers 754, a determined highest priority resource 756, a selected connection identifier 758, information identifying resources corresponding to the selected identifier 760, a generated traffic transmission request signal 762, a received RX echo signal 764, and a generated traffic signal 766. Data/information 720 also includes information associating traffic transmission resources with connection identifiers 782 and timing/frequency structure information 768. The timing frequency structure information 768 includes information corresponding to a plurality of intervals in a recurring timing structure (slot 1 information 770, . . . , slot N information 772). Slot 1 information 770 includes connection ID broadcast interval information 774, connection ID handshaking interval information 776, TX request/response interval information 780 and traffic data interval information 780. In some embodiments, the slot 1 information 770 includes information identifying and/or defining multiple TX request/response/traffic data interval sets corresponding to a single connection ID broadcast interval/connection ID handshaking interval pair. Thus established and agreed upon connection IDs are, in such an embodiment, used for multiple successive traffic slots in a traffic interval.

Connection identifier monitoring module 726 detects signals received during a connection identifier broadcast interval and determines unused connection identifiers. Connection identifier monitoring module 726 determines a set of available connection identifiers including connection identifiers indicated by signals received during the connection identifier broadcast interval to be unused connection identifiers. Detected signal corresponding to first unavailable connection identifier 744 and detected signal corresponding to N unavailable connection identifier are signal detected by connection identifier monitoring module 726 while list of determined unused connection identifiers 748 is an output of connection identifier monitoring module 726.

Connection availability signal generation module 728 generates a signal conveying information identifying a set of available connection identifiers. List of determined unused connection identifiers 748 is an input to connection availability signal generation module 728 while generated available connection identifier set signal 750 is an output of module 728.

Connection availability response signal recovery module 730 identifiers a subset of available connection identifiers from a signal received from the communications device to which the generated available connection identifier set signal was communicated. Received signal conveying available connection identifier subset 752 is an input to connection availability response signal recovery module 730, while recovered subset of available connection identifiers 754 is an output of module 730. In various embodiments, the subset includes, at times, multiple connection identifiers corresponding to a single communications link between the first communications device and a second communications device.

Peer communications control module 732 uses a connection identifier included in the received subset identified by information 754 to communicate with a second device, e.g., the device which transmitted the subset, over a connection. In various embodiments, the connection is a bi-directional connection.

Resource selection module 736 selects to use the highest priority traffic transmission resource which corresponds to one of the received subset of multiple connection identifiers. For example, each of the connection identifiers of the subset is associated with a different traffic transmission request resource and the different traffic transmission request resources are associated with different priorities. The resource selection module 736 selects the highest priority traffic transmission resource corresponding to a member of the subset for transmission of the request. This selection also by virtue of the linkage between transmission traffic request resources and connection identifiers also selects a connection identifier. Determined highest priority resource 756 and selected connection identifier 758 are outputs of the resource selection module 736.

Traffic transmission request signal generation module 734 generates a traffic transmission request to another device, e.g., to a second device. Generated traffic transmission request 762 is an output of module 734. The generated traffic transmission request is communicated using the traffic transmission request resource, e.g., OFDM tone-symbol, identified by determined highest priority resource 756 and corresponding to selected connection identifier 758.

Request response monitoring module 738 monitors a transmission request response resource to detect the reception of a transmission request response signal, e.g., an RX echo signal, from the device to which the request was transmitted. For example, corresponding to the request resource which conveyed the traffic transmission request, there is a corresponding request response resource. If the device to which the request was sent, e.g., the second device, acquiesces to the request it responds by transmitting an RX echo signal using that request response resource. However, if it des not acquiesce to the request then it does not transmit an RX echo signal. Received RX echo signal 764 is a signal detected by request response monitoring module 738, e.g., signifying that the first wireless device 700 may proceed with the traffic signaling.

Traffic data control module 740 controls the transmitter module 704 to transmit data to another device, e.g., the second device, during a traffic interval corresponding to a transmitted traffic request, e.g., a transmitted traffic request for which an RX echo signal was received. Generated traffic signal 766, e.g., a peer to peer traffic signal communicating user data such as text data, audio data and/or image data, is transmitted by wireless transmitter module 704 under the direction of traffic data control module 740.

Connection identifier to transmission resource mapping module 742 determines a mapping of transmission resources including transmission request resources to connection identifiers as a function of time. Thus connection identifier to transmission resource mapping module 742 determines a mapping of transmission request resources to connection identifiers for a first time interval and for a second time interval, the first and second time intervals being different, and the mapping between request resources and connection identifiers changing between first and second time intervals. Connection identifier to transmission resource mapping module 742 uses stored information associating traffic transmission resources with connection identifiers 782 and timing/frequency structure information 768 in determining the mappings.

Connection ID broadcast interval information 774 identifies a time interval for which the connection identifier monitoring module 726 operates. Connection ID handshaking interval information 776 identifies an interval during which a connection availability signal and a connection availability response signal are communicated. TX request/response interval information 778 identifies an interval during which a transmission traffic request signal and an RX echo signal are communicated. Traffic interval information 780 identifies an interval during which a traffic signal, e.g., a peer to peer traffic signal, is communicated.

FIG. 8 is drawing illustrating various aspects of connection identifier assignment in accordance with one exemplary embodiment. In FIG. 8 exemplary peer to peer wireless communications system 800 includes a plurality of peer to peer wireless terminals (WT 1 802, WT 2 804, WT 3 806, WT 4 808, WT 5 810, WT 6 812, WT 7 814, WT 8 816, WT 9 818, WT 10 820). The WTs of FIG. 8 are, e.g., WTs in accordance with WT 700 of FIG. 7 and/or in accordance with the method of flowchart 300 of FIG. 3, flowchart 500 of FIG. 5 and/or flowchart 600 of FIG. 6. Active connections exist between four pairs of the wireless terminals. Connection 824 exists between WT 2 804 and WT 5 810, and the connection is associated with one connection identifier, $C_2$. Connection 826 exists between WT 3 806 and WT 4 808, and the connection is associated with two connection identifiers, $C_4$ and $C_6$. Connection 822 exists between WT 7 814 and WT 8 816, and the connection is associated with one connection identifier, $C_1$. Connection 828 exists between WT 9 818 and WT 10 820, and the connection is associated with one connection identifier, $C_5$. During a connection identifier broadcast interval, wireless terminals corresponding to existing active connections broadcast their connection identifier information.

In this example, WT 1 802 and WT 6 812, which are aware of the presence of each other, desire to establish a connection, which is represented by dotted line 830. Drawing 850 illustrates various operations performed to reach agreement on the connection identifier or identifiers to be used for the connection. Axis 851 illustrates time. During the connection identifier broadcast interval, both WT 1 802 and WT 6 812 have been monitoring, and identify detected connection identifiers. Since WT 1 and WT 6 are at different locations, they may detect different connection identifiers in use. In this embodiment, there are a set of 256 different connection identifiers which can assigned. WT 1 and WT 6 each form a list of unused connection identifiers from their perspective. Block 852 indicates the WT 1 unused connection list is: $C_3$, $C_5$, and $C_6$-$C_{256}$. Block 854 indicates the WT 6 unused connection list is: $C_1$, $C_3$, and $C_6$-$C_{256}$. In this example, WT 1 happens to initiate the connection request to WT 6, forms a suggested connection list, generates a signal communicating the suggested list and quality of service information, and communicates the generated signal to WT 6. The quality of service information is used to derive the number of connection identifiers to be assigned to the connection. Block 856 indicates that the WT 1 suggested connection list is: $C_3$, $C_5$, $C_6$, $C_7$, $C_8$ and the QoS information indicates that WT 1 would like 3 connection identifiers to be assigned. WT 6 receives the signal conveying the suggested list of connection identifiers to be used and quality of service information, and processes the received signal. WT 6 selects three connection identifiers from the suggested list which are also included in its unused connection list 854. WT 6 generates a response signal communicating the selected list of connection identifiers to be used for the connection, and transmits the signal to WT 1. Block 858 indicates the selected connection list includes $C_3$, $C_6$ and $C_7$. WT 1 receives the list of suggested connection identifiers.

WT 1 and WT 6 use the list of selected connection identifiers for operations with their connection 830, e.g., identifying resources which have been allocated to connection such as transmission request resources, corresponding transmission request response resources, and traffic transmission resources for peer to peer traffic transmission operations. Those identified resources are used by WT 1 and WT 6 in the communication of peer to peer traffic signals.

The techniques of various embodiments may be implemented using software, hardware and/or a combination of software and hardware. Various embodiments are directed to apparatus, e.g., mobile nodes such as mobile terminals, base stations, communications system. Various embodiments are also directed to methods, e.g., method of controlling and/or operating mobile nodes, base stations and/or communications systems, e.g., hosts. Various embodiments are also directed to machine, e.g., computer, readable medium, e.g., ROM, RAM, CDs, hard discs, etc., which include machine readable instructions for controlling a machine to implement one or more steps of a method.

In various embodiments nodes described herein are implemented using one or more modules to perform the steps corresponding to one or more methods, for example, signal processing, a decision step, message generation, message signaling, switching, reception and/or transmission steps. Thus, in some embodiments various features are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium including machine executable instructions for causing a machine, e.g., processor and associated hardware, to perform one or more of the steps of the above-described method(s). Some embodiments are directed to a device, e.g., communications device, including a processor configured to implement one, multiple or all of the steps of one or more methods of the invention.

In some embodiments, the processor or processors, e.g., CPUs, of one or more devices, e.g., communications devices such as wireless terminals are configured to perform the steps of the methods described as being as being performed by the communications device. Accordingly, some but not all embodiments are directed to a device, e.g., communications device, with a processor which includes a module corresponding to each of the steps of the various described methods performed by the device in which the processor is included. In some but not all embodiments a device, e.g., communications device, includes a module corresponding to each of the steps of the various described methods performed by the device in which the processor is included. The modules may be implemented using software and/or hardware.

Some embodiments are directed to a computer program product comprising a computer-readable medium comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a method of controlling a communications device or node. The code may be in the form of machine, e.g., computer, executable instructions stored on a computer-readable medium such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device or other device described in the present application.

While described in the context of an OFDM system, at least some of the methods and apparatus of various embodiments are applicable to a wide range of communications systems including many non-OFDM and/or non-cellular systems.

Numerous additional variations on the methods and apparatus of the various embodiments described above will be apparent to those skilled in the art in view of the above description. Such variations are to be considered within the scope. The methods and apparatus may be, and in various embodiments are, used with CDMA, orthogonal frequency division multiplexing (OFDM), and/or various other types of communications techniques which may be used to provide wireless communications links between access nodes and mobile nodes. In some embodiments the access nodes are implemented as base stations which establish communications links with mobile nodes using OFDM and/or CDMA. In various embodiments the mobile nodes are implemented as notebook computers, personal data assistants (PDAs), or other portable devices including receiver/transmitter circuits and logic and/or routines, for implementing the methods.

What is claimed is:

1. A method of operating a first peer communications device to communicate with a second peer communications device, in a system supporting multiple peer to peer connections, the method comprising:

monitoring, by the first peer communications device, a connection identifier broadcast interval to identify unused connection identifiers of a set of connection identifiers associated with one or more symbols and tones for peer to peer connections, each connection identifier in the set of connection identifiers for identifying a peer to peer connection between the first and the second peer communications devices;

transmitting, by the first peer communications device, a set of available and unused connection identifiers from the identified unused connection identifiers for peer to peer connections to the second peer communications device; and receiving, by the first peer communications device, from the second peer communications device a subset of said transmitted set of available and unused connection identifiers, said subset of connection identifiers including identifiers to be used for peer to peer connection between said first and second peer communications devices.

2. The method of claim 1, further comprising:
using, by the first peer communications device, a connection identifier included in said received subset to communicate with said second peer communications device.

3. The method of claim 1, wherein said peer to peer connection is a bi-directional connection.

4. The method of claim 1, wherein said received subset includes multiple connection identifiers corresponding to a single communications link between said first and second peer communications devices.

5. The method of claim 4, wherein different traffic transmission resources are associated with different connection identifiers, the different traffic transmission resources having different priorities.

6. The method of claim 1, wherein said connection identifier broadcast interval is an interval during which peer communications devices having existing active connections broadcast connection identifier information indicating connection identifiers the peer communications devices are using.

7. The method of claim 1, wherein said connection identifiers are orthogonal media access control (MAC) identifiers.

8. The method of claim 1, wherein the monitoring, by the first peer communications device, the connection identifier broadcast interval comprises receiving, by the first peer communications device, broadcasted used connection identifiers of the set of connection identifiers, wherein the unused connection identifiers are identified based on the received broadcasted used connection identifiers.

9. The method of claim 1, wherein the one or more of the symbols and the tones are associated with orthogonal frequency division multiplexing (OFDM).

10. A method of operating a first communications device to communicate with a second device, in a system supporting multiple communications connections, the method comprising:
monitoring a connection identifier broadcast interval to identify unused connection identifiers;
transmitting a set of available connection identifiers from the identified unused connection identifiers to the second device;
receiving from the second device a subset of said transmitted set of available connection identifiers, said subset of connection identifiers including identifiers to be used for a communications connection between said first and second devices, wherein said received subset includes multiple connection identifiers corresponding to a single communications link between said first and second devices; and
transmitting a traffic transmission request to the second device using the highest priority traffic transmission resource which corresponds to one of said received subset of multiple connection identifiers,
wherein different traffic transmission resources are associated with different connection identifiers, the different traffic transmission resources having different priorities.

11. The method of claim 10, further comprising:
receiving a transmission request echo from the second device on a transmission request echo resource corresponding to traffic transmission resource used to transmit the traffic transmission request; and
transmitting data to the second device during a traffic interval corresponding to the transmitted traffic request.

12. The method of claim 11, wherein said transmission request resources are tone symbols in a set of time—frequency resources.

13. The method of claim 10, further comprising:
determining a new mapping of transmission request resources to connection identifiers; and
transmitting another traffic transmission request to the second device using the highest priority traffic transmission resource which corresponds to one of said received subset of multiple connection identifiers as determined during said mapping operation.

14. A first peer communications device comprising:
a connection identifier monitoring module configured to monitor a connection identifier broadcast interval to identify unused connection identifiers of a set of connection identifiers associated with one or more symbols and tones for peer to peer connections, each connection identifier in the set of connection identifiers for identifying a peer to peer connection between two peer communications devices;
a connection availability signal generation module configured to generate a signal conveying information identifying a set of available and unused connection identifiers for peer to peer connections;
a wireless transmitter module configured to transmit said generated signal conveying information identifying a set of available and unused connection identifiers for peer to peer connections to a second peer communications device; and
a wireless receiver module configured to receive from the second peer communications device information indicating a subset of said transmitted set of available and unused connection identifiers, said subset of connection identifiers including identifiers to be used for a peer to peer connection between said first and second peer communications devices.

15. The first peer communications device of claim 14, wherein the connection identifier monitoring module is configured to detect signals received during the connection identifier broadcast interval and for determining unused connection identifiers, said set of available connection identifiers including connection identifiers indicated by signals received during said connection identifier broadcast interval to be unused connection identifiers.

16. The first peer communications device of claim 15, further comprising:
a peer communications control module configured to use a connection identifier included in said received subset to communicate with said second peer communications device over a connection.

17. The first peer communications device of claim 16, wherein said connection is a bi-directional connection.

18. The first peer communications device of claim 15, wherein said subset includes multiple connection identifiers corresponding to a single communications link between said first and second peer communications devices.

19. The first peer communications device of claim 18, further including a memory and wherein the memory includes information associating different traffic transmission resources with different connection identifiers, the different traffic transmission resources having different priorities.

20. The first peer communications device of claim 14, further comprising:
a connection availability response signal recovery module configured to identify said subset of connection identifiers from the received information.

21. The first peer communications device of claim 14, wherein said connection identifier broadcast interval is an interval during which peer communications devices having existing active connections broadcast connection identifier information indicating connection identifiers the peer communications devices are using.

22. A first communications device comprising:
a connection availability signal generation module configured to generate a signal conveying information identifying a set of available connection identifiers;
a wireless transmitter module configured to transmit said generated signal conveying information identifying a set of available connection identifiers to a second device;
a wireless receiver module configured to receive from the second device information indicating a subset of said transmitted set of available connection identifiers, said subset of connection identifiers including identifiers to be used for a communications connection between said first and second devices, wherein said subset includes multiple connection identifiers corresponding to a single communications link between said first and second devices;
a connection identifier monitoring module configured to detect signals received during a connection identifier broadcast interval and for determining unused connection identifiers, said set of available connection identifiers including connection identifiers indicated by signals received during said connection identifier broadcast interval to be unused connection identifiers;
a memory and wherein the memory includes information associating different traffic transmission resources with different connection identifiers, the different traffic transmission resources having different priorities;
a traffic transmission request signal generation module configured to generate a traffic transmission request to the second device;
a resource selection module configured to use the highest priority traffic transmission resource which corresponds to one of said received subset of multiple connection identifiers; and
wherein the wireless transmitter module is also configured to transmit the generated traffic transmission request signal to the second device using the selected highest priority traffic transmission resource.

23. The first communications device of claim 22, wherein said wireless receiver module is also configured to receive a transmission request echo from the second device on a transmission request response resource corresponding to traffic transmission resource used to transmit the traffic transmission request; and
wherein the first communications device further comprises:
a request response monitoring module configured to monitor the transmission request response resource to detect the reception of the transmission request echo from the second device; and
a traffic data control module configured to control the transmitter module to transmit data to the second device during a traffic interval corresponding to the transmitted traffic request.

24. The first communications device of claim 23, wherein said transmission request resources are tone symbols in a set of time—frequency resources.

25. The first communications device of claim 22, further comprising:
a connection identifier to transmission resource mapping module configured to determine a mapping of transmission request resources to connection identifiers for a first time interval and a second time interval, the first and second time intervals being different; and wherein the mapping between transmission request resources and connection identifiers changes between the first and second time intervals.

26. A first peer communications device comprising:
connection identifier monitoring means for monitoring a connection identifier broadcast interval to identify unused connection identifiers of a set of connection identifiers associated with one or more symbols and tones for peer to peer connections, each connection identifier in the set of connection identifiers for identifying a peer to peer connection between two peer communications devices;
connection availability signal generation means for generating a signal conveying information identifying a set of available and unused connection identifiers for peer to peer connections;
wireless transmitter means for transmitting said generated signal conveying information identifying a set of available and unused connection identifiers for peer to peer connections to a second peer communications device; and
wireless receiver means for receiving from the second peer communications device information indicating a subset of said transmitted set of available and unused connection identifiers for peer to peer connections, said subset of connection identifiers including identifiers to be used for a peer to peer connection between said first and second peer communications devices.

27. The first peer communications device of claim 26, wherein the connection identifier monitoring detects signals received during the connection identifier broadcast interval and determines unused connection identifiers, said set of available connection identifiers including connection identifiers indicated by signals received during said connection identifier broadcast interval to be unused connection identifiers.

28. The first peer communications device of claim 27, further comprising:
peer communications control means for using a connection identifier included in said received subset to communicate with said second peer communications device over a connection.

29. The first peer communications device of claim 28, wherein said connection is a bi-directional connection.

30. The first peer communications device of claim 26, further comprising:

connection availability response signal recovery means for identifying said subset of connection identifiers from the received information.

31. The first peer communications device of claim 26, wherein said connection identifier broadcast interval is an interval during which peer communications devices having existing active connections broadcast connection identifier information indicating connection identifiers the peer communications devices are using.

32. A computer program product, comprising:
non-transitory computer-readable medium comprising:
code for causing at least one computer in a first peer communications device to monitor a connection identifier broadcast interval to identify unused connection identifiers of a set of connection identifiers associated with one or more symbols and tones for peer to peer connections, each connection identifier in the set of connection identifiers for identifying a peer to peer connection between two peer communications devices;
code for causing the at least one computer in said first peer communications device to transmit a set of available and unused connection identifiers from the identified unused connection identifiers for peer to peer connections to a second peer communications device; and
code for causing the at least one computer in said first peer communications device to receive from the second peer communications device a subset of said transmitted set of available and unused connection identifiers for peer to peer connections, said subset of connection identifiers including identifiers to be used for a peer to peer connection between said first and second peer communications devices.

33. The computer program product of claim 32, wherein the non-transitory computer-readable medium further comprises:
code for causing the at least one computer in said first peer communications device to use a connection identifier included in said received subset to communicate with said second peer communications device.

34. The computer program product of claim 32, wherein said connection is a bi-directional connection.

35. The computer program product of claim 32, wherein said received subset includes multiple connection identifiers corresponding to a single communications link between said first and second peer communications devices.

36. The computer program product of claim 35, wherein different traffic transmission resources are associated with different connection identifiers, the different traffic transmission resources having different priorities.

37. The computer program product of claim 32, wherein said connection identifier broadcast interval is an interval during which peer communications devices having existing active connections broadcast connection identifier information indicating connection identifiers the peer communications devices are using.

38. An apparatus for use in a first peer communications device comprising:
a processor configured to:
monitor a connection identifier broadcast interval to identify unused connection identifiers of a set of connection identifiers associated with one or more symbols and tones for peer to peer connections, each connection identifier in the set of connection identifiers for identifying a peer to peer connection between two peer communications devices;
transmit a set of available and unused connection identifiers from the identified unused connection identifiers for peer to peer connections to a second peer communications device; and
receive from the second peer communications device a subset of said transmitted set of available and unused connection identifiers for peer to peer connections, said subset of connection identifiers including identifiers to be used for a peer to peer connection between said first and second peer communications devices.

39. The apparatus of claim 38, wherein the processor is further configured to:
use a connection identifier included in said received subset to communicate with said second peer communications device.

40. The apparatus of claim 38, wherein said connection is a bi-directional connection.

41. The apparatus of claim 38, wherein said received subset includes multiple connection identifiers corresponding to a single communications link between said first and second peer communications devices.

42. The apparatus of claim 41, wherein different traffic transmission resources are associated with different connection identifiers, the different traffic transmission resources having different priorities.

43. The apparatus of claim 38, wherein said connection identifier broadcast interval is an interval during which peer communications devices having existing active connections broadcast connection identifier information indicating connection identifiers the peer communications devices are using.

* * * * *